United States Patent
Shaffer et al.

(10) Patent No.: US 8,515,027 B2
(45) Date of Patent: Aug. 20, 2013

(54) METHOD AND SYSTEM FOR RECALLING VOICEMAIL MESSAGES

(75) Inventors: Shmuel Shaffer, Palo Alto, CA (US);
Mukul Jain, San Jose, CA (US);
Sanjeev Kumar, San Francisco, CA (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1596 days.

(21) Appl. No.: 11/448,277

(22) Filed: Jun. 7, 2006

(65) Prior Publication Data
US 2007/0286354 A1  Dec. 13, 2007

(51) Int. Cl.
*H04M 1/64* (2006.01)
*H04B 1/26* (2006.01)

(52) U.S. Cl.
USPC ........................................ 379/88.12; 455/413

(58) Field of Classification Search
USPC ............... 379/9.04, 68, 71, 85, 88.02, 266.1, 379/113
See application file for complete search history.

(56) References Cited

U.S. PATENT DOCUMENTS

| | | | |
|---|---|---|---|
| 6,266,159 B1 * | 7/2001 | Otsuka et al. | 358/405 |
| 6,327,346 B1 * | 12/2001 | Infosino | 379/88.02 |
| 6,529,871 B1 * | 3/2003 | Kanevsky et al. | 704/246 |
| 6,999,566 B1 | 2/2006 | Eason et al. | |
| 7,035,382 B1 | 4/2006 | Shin et al. | |
| 7,054,819 B1 | 5/2006 | Loveland | |
| 2001/0008554 A1 * | 7/2001 | Finnigan | 379/88.02 |
| 2002/0087323 A1 * | 7/2002 | Thomas et al. | 704/270 |
| 2003/0099334 A1 * | 5/2003 | Contractor | 379/88.13 |
| 2003/0179863 A1 * | 9/2003 | Wescott | 379/88.16 |
| 2004/0165702 A1 * | 8/2004 | Finnigan | 379/88.02 |
| 2004/0240631 A1 * | 12/2004 | Broman et al. | 379/88.02 |
| 2005/0008128 A1 * | 1/2005 | Trinkel | 379/88.22 |
| 2005/0069095 A1 * | 3/2005 | Fellenstein et al. | 379/88.02 |
| 2005/0238147 A1 * | 10/2005 | Carro | 379/88.13 |
| 2006/0188076 A1 * | 8/2006 | Isenberg | 379/88.02 |
| 2006/0271543 A1 * | 11/2006 | Dodson et al. | 707/9 |
| 2007/0263789 A1 * | 11/2007 | Palazzo | 379/67.1 |

OTHER PUBLICATIONS

Shopping Mobile Services, https://www.bdigital.com.au/bweb/html/shopping/mobile_services.html?service=standard_services/voicemail_call_recall.xml; 4 pages.

* cited by examiner

*Primary Examiner* — Simon Sing
*Assistant Examiner* — Solomon Bezuayehu
(74) *Attorney, Agent, or Firm* — Fish & Richardson P.C.

(57) ABSTRACT

Techniques and systems for recalling voicemail messages from remote voicemail systems are disclosed. In one embodiment, a method for recalling a voicemail message from a target mailbox can include: accessing a voicemail system by a caller using a device; authenticating the caller using speaker verification; and deleting the voicemail message from the target mailbox. The target mailbox owner can be a member of the voicemail system, while the caller can be a non-member of that voicemail system. The device may be configured to support a telephony user interface (TUI), for example.

23 Claims, 4 Drawing Sheets

METHOD AND SYSTEM FOR RECALLING VOICEMAIL MESSAGES

BACKGROUND OF THE INVENTION

Embodiments of the present invention relate in general to voicemail systems and, more specifically, to techniques for recalling voicemail messages from remote voicemail systems.

When a person sends an e-mail to another person, but later has second thoughts about the sent e-mail, some systems allow the sender to recall that e-mail message using an e-mail client. In this case, a graphical user interface (GUI) of the mail client can be used to recall the message. Such functionality may work particularly well when the sender and the recipient of the e-mail use a system from a common manufacturer. Similarly, some voicemail systems may allow "local" or previously authorized users (e.g., those within a company's voicemail system) to recall a voicemail message. However, such applications may not allow a user calling from any phone, such as one calling from a phone attached to another voicemail system or a phone without voicemail support, to perform such voicemail message recalling.

DETAILED DESCRIPTION OF EMBODIMENTS OF THE INVENTION

Embodiments of the present invention can generally provide a system that allows a caller who has left a voicemail message to recall the message from a recipient's voicemail mailbox using any phone (e.g., a public phone, or a phone from another voicemail system).

In one aspect of embodiments of the present invention, a system can allow a caller to recall a voicemail message using any phone. In another aspect of embodiments, the system can allow a caller to recall a voicemail message from any voicemail system, such as those with or without an account supported or membership for the user. In another aspect of embodiments, the system can utilize word challenge and/or other speaker identification or verification techniques to ensure that only the caller who left the voicemail message can recall that message. In yet another aspect of embodiments, the system can allow a caller to specify a particular voicemail for recall by prompting the caller to utter words the caller used in that specific voicemail message.

In another aspect of embodiments of the present invention, a recipient can allow or disallow a caller's ability to recall voicemail messages left in the recipient's mailbox. In another aspect of embodiments, a voicemail recipient can be informed whenever voicemail messages are recalled from the recipient's mailbox. In yet another aspect of embodiments, the voicemail system can maintain a log of all recalled messages. Such a log may include who recalled a voicemail message and when it was recalled, for example.

Figure 1:
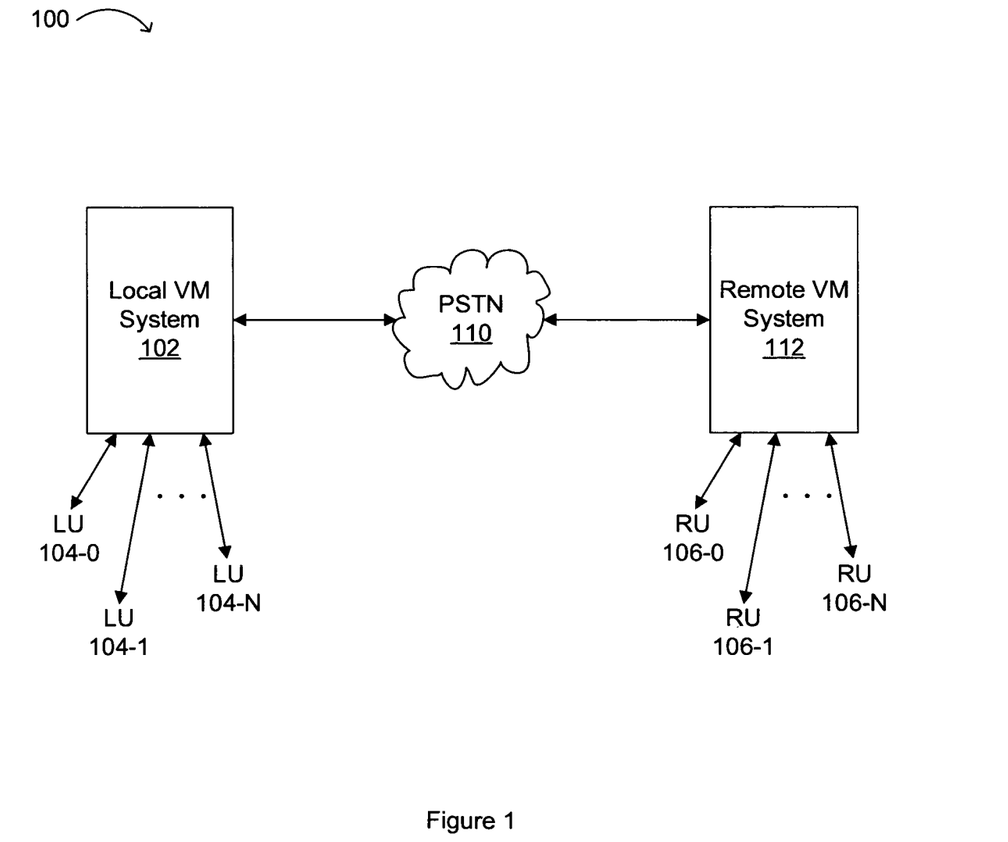
FIG. 1 depicts an arrangement of local and remote voicemail systems suitable for use in accordance with embodiments of the present invention.

Referring now to FIG. 1, an arrangement of local and remote voicemail systems suitable for use in accordance with embodiments of the present invention is indicated by the general reference character 100. Local voicemail (VM) system 102 can interface with public switched telephone network (PSTN) 110. Remote VM system 112 can also interface with PSTN 110, for example. Typically, a voicemail system can include a server configured to support voicemails. Local users (LU) 104-0, 104-1, . . . through LU 104-N can attach to and/or be members of local VM system 102. For example, the local users may all be employees of a corporation and local VM system 102 may be the corporation's voicemail system. Similarly, remote users (RU) 106-0, 106-1, . . . through RU 106-N can attach to and/or be members of remote VM system 112. For example, the remote users may all be employees of another corporation and remote VM system 112 may be that corporation's voicemail system.

For the sake of simplicity, arrangement 100 of FIG. 1 does not depict a private branch exchange (PBX) and/or a central office to which the VM systems may be connected. Further, although not shown in FIG. 1, one skilled in the art will recognize that local VM system 102 and/or remote VM system 112 can be connected via a local area network (LAN), a wide area network (WAN), a cellular network, and/or any other suitable network that can carry associated media.

Typically, for a user operating within a VM system in which he is a member or a recognized user, that user need only provide a password in order to access his voicemail mailbox. Such access can also be accommodated from any phone or device. For example, if LU 104-0 has left a voicemail message for LU 104-1 that LU 104-0 later wishes to recall, LU 104-0 can be authenticated merely by providing his password. Local VM system 102 can recognize this password and allow LU 104-0 to recall a voicemail message he had previously left on any mailbox operating in local VM system 102. However, such functionality may not extend to remote VM system 112 because LU 104-0, 104-1, . . . through LU 104-N are not recognized by (i.e., are not members of) remote VM system 112, as are its remote users RU 106-0, 106-1, . . . through RU 106-N, for example.

In accordance with embodiments of the present invention, when a caller (e.g., one of LU 104-0, 104-1, . . . through LU 104-N) wishes to recall a message he has left on a target system (e.g., remote VM system 112) in a recipient's mailbox (e.g., one of RU 106-0, 106-1, . . . through RU 106-N), the caller can call the target mailbox, get authenticated, and recall the voicemail message. In one embodiment, the caller can call a general access number for the voicemail system (e.g., remote VM system 112) of the target mailbox (e.g., one of RU 106-0, 106-1, . . . through RU 106-N).

In another embodiment, the caller can call the recipient again and be transferred to the recipient's voicemail mailbox. For example, once the caller hears the recipient's voicemail greeting, the caller can press the "*" key to signal that he would like to interact with the associated voicemail system. As will be discussed in more detail below, the caller can be authenticated during this process and may then employ a "recall message" option to delete the desired voicemail message. Alternatively, the caller can utilize a guest account supported by remote VM system 112. In this alternative approach, the caller can simply log onto remote VM system 112 as a guest and the caller can be authorized in this manner. Generally, in accordance with embodiments of the present invention, a caller can call the target mailbox, get authenticated, and recall the voicemail message.

Figure 2:
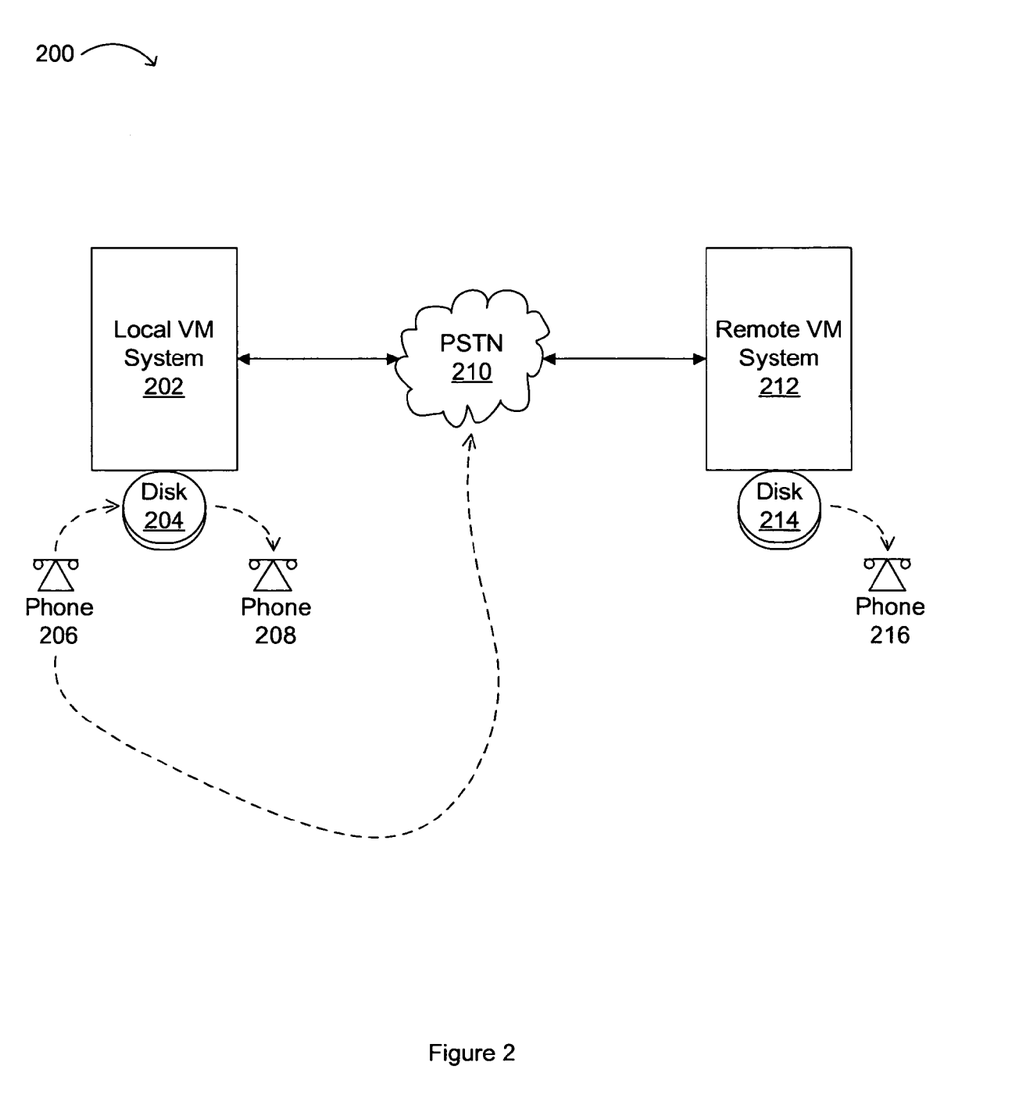
FIG. 2 depicts exemplary local and remote voicemail system access suitable for use in accordance with embodiments of the present invention.

Referring now to FIG. 2, exemplary local and remote voicemail system access suitable for use in accordance with embodiments of the present invention is indicated by the general reference character 200. Local VM system 202 and remote VM system 212 can interface with PSTN 210, for example. Disk 204 can be coupled to local VM system 202 and disk 214 can be coupled to remote VM system 212. Such disks can be used to store voicemail messages, for example.

A local user and/or caller can leave a voicemail message for a user of a local phone. The caller may then utilize an existing "recall message" feature in order to recall an unintended message. For example, a local user and/or caller can access local VM system 202 using phone 206 and may leave a voicemail message for a recipient local user of phone 208. If this voicemail message was in error, was otherwise not intended, or for whatever reason the user of phone 206 wishes to recall that message, a recall message option may be employed. In many modern voicemail systems, such a recall message option is available, but can only be used by authorized users or members of local VM system 202.

In accordance with embodiments of the present invention, voicemail messages left on remote voicemail systems can be recalled. In the example of FIG. 2, a local user of phone 206 can access remote VM system 212 via PSTN 210. In this case, a voicemail message can be left for a recipient user of phone 216 and may be stored on disk 214, for example. Because local VM system 202 and remote VM system 212 are different, and possibly not fully compatible or cooperating systems, an authentication of a user of phone 206 by remote VM system 212 may be required in order to delete or recall such a voicemail message. Such a user, however, does not need authentication in order to simply leave the voicemail message.

If a user of phone 206 wants to recall a voicemail message left in a recipient's mailbox (e.g., for phone 216) left on remote VM system 212, the user can again call the recipient's mailbox (e.g., for phone 216). The user can then indicate that he wants to delete the voicemail message. In response to this recall indication, remote VM system 212 can determine if the recipient's mailbox contains a voicemail message with the same voice characteristics as that of the local caller or user. If the voice characteristics do match, remote VM system 212 can proceed to authenticate the caller using a challenge word, for example.

To initiate an authentication procedure, the caller can be prompted to enter the recipient's mailbox number. After entering this information using an access device (e.g., phone 206) that can accommodate a telephony user interface (TUI), the system (e.g., remote VM system 212) can present the caller with a sequence of words and a request to repeat the word sequence. The system can use speaker verification technology to compare a voice signature of the caller with a voice signature of the messages in the recipient's mailbox. If the system finds any messages that were left by the caller, the system can then present the caller with the option of deleting the desired message. In a situation where several messages have been left in a recipient's mailbox by the same caller, the TUI can allow for a cycling through of each message, with a prompt for the caller at each message to either delete that voicemail message or to move on to the next message.

In accordance with embodiments of the present invention, the system (e.g., remote VM system 212) can inform a recipient (e.g., a user of phone 216) that a caller (e.g., a user of phone 206) left the recipient a voicemail message and then later recalled that message. Further, this informing of the recipient can be enabled or disabled by the recipient as part of exercising mailbox options. In accordance with another embodiment of the present invention, the system (e.g., remote VM system 212) can maintain a log of all such recalled messages to allow for user traceability. For example, if a user of phone 206 is repeatedly calling users of remote VM system 212 and leaving voicemail messages, but then recalling one or more of the messages, this information can be tracked by remote VM system 212.

Figure 3:
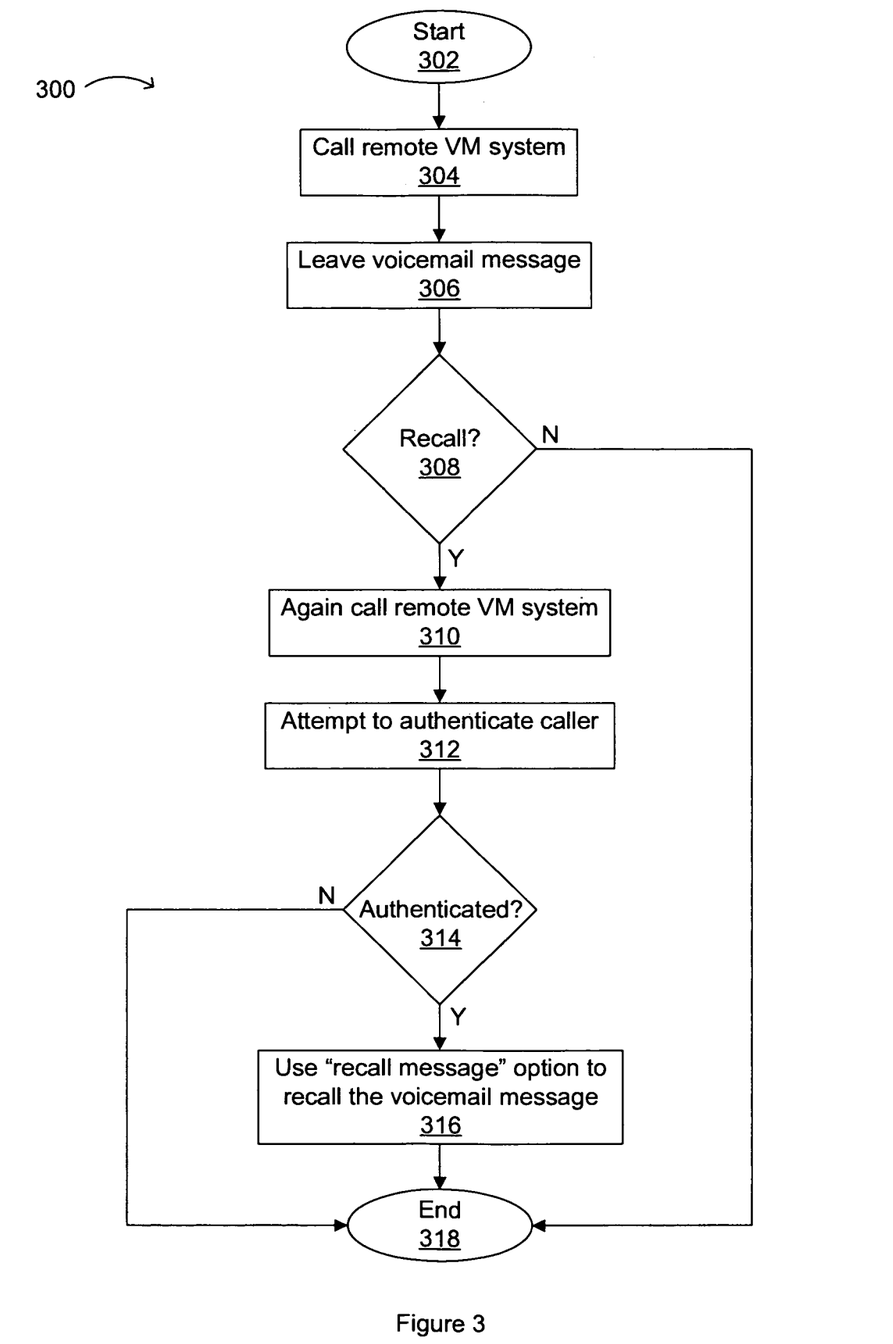
FIG. 3 depicts a simplified flow chart of a generalized method of leaving and recalling voicemails from a remote voicemail system in accordance with embodiments of the present invention.

Referring now to FIG. 3, a simplified flow chart of a generalized method of leaving and recalling voicemails from a remote voicemail system in accordance with embodiments of the present invention is indicated by the general reference character 300. The flow can begin (302) and a user can call a remote voicemail (VM) system (304). The user can leave a voicemail message on that remote voicemail system (306). The call to leave a voicemail message can be made from any phone (i.e., in or out of the voicemail system). If the user does not wish to recall the voicemail message (308), the flow can complete (318).

If the user wants to recall the voicemail message (308) (e.g., by calling at some later time), the remote VM system can again be called (310). This call can be made from a device not on or not a member of the remote voicemail system, for example. This call can either be made to a general voicemail access number for the remote VM system or the recipient's mailbox number itself can be called again. As the caller communicates with the recipient's voicemail system, the caller may need to first indicate to the system that he wishes to recall an old voicemail message that he previously left on that system in a specific recipient's mailbox. Only after the caller indicates his wish to recall such a voicemail message can the system attempt to authenticate the caller as the owner of one of the messages in the recipient's mailbox.

Next, an attempt can be made to authenticate the caller (312). If the caller cannot be authenticated (314), the flow can complete (318). In such a situation, the caller may not be a person who left any of the voicemails in that recipient's mailbox. However, if the user can be authenticated (314), a "recall message" option on the remote voicemail system can be used to recall the unwanted voicemail message (316) and the flow can complete (318).

In one aspect of embodiments of the present invention, the caller can interact with the remote voicemail system using spoken words. The system can employ adaptive speech recognition or natural language recognition to act upon the spoken commands of the caller. The remote voicemail system can also use a frequency signature of the caller's voice to check if the recipient's mailbox has an unheard voicemail message in that specific recipient's mailbox. Only if such preliminary tests are passed can the remote voicemail system then invoke a word challenge algorithm to authenticate the caller based on the caller's voice signature using typical speaker identification techniques.

As part of an authentication process in accordance with embodiments of the present invention, the system can use words that were left in the recipient's mailbox and play those words to the caller using text-to-speech (TTS) speech synthesis to mask a vocal signature of a person who left the message containing those words. This approach can ensure privacy and/or security for messages left by persons other than the caller who is attempting to delete his own voicemail message. In another embodiment, the system can challenge the caller to repeat random words that may have similar frequency characteristics as the words in the original voicemail message.

In another embodiment, the system can ask a caller to utter a few words that the caller used in a message that he left in the recipient's mailbox. These words can be used by the system to narrow the search for a specific message the caller wishes to recall. Another way to narrow such a search in accordance with embodiments is to allow the caller to enter temporal information (e.g., a date or a range of dates and/or times) of the voicemail message the caller wishes to recall. In this fashion, a caller can be authenticated and the caller can also facilitate a searching through multiple voicemail messages found in a recipient's mailbox.

Figure 4:
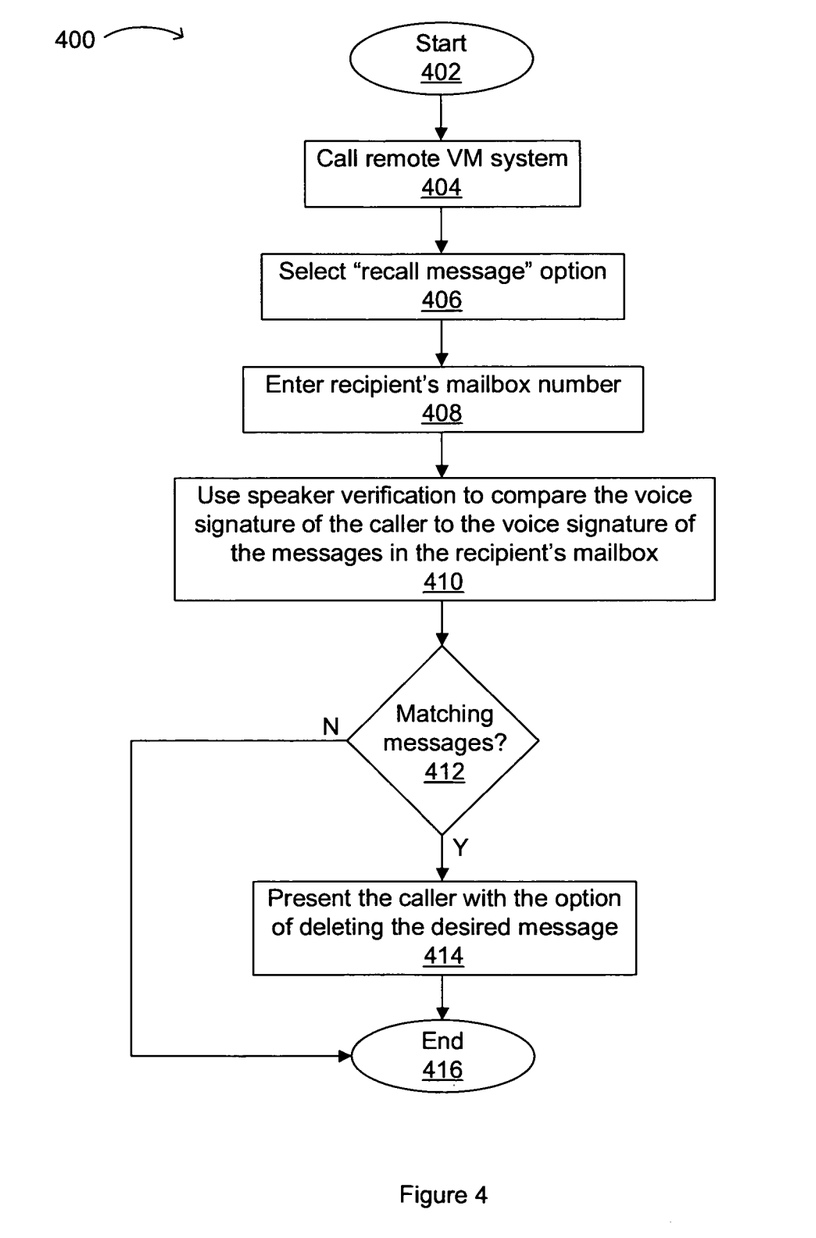
FIG. 4 depicts a simplified flow chart of a method of authenticating a user for recalling voicemails from a remote voicemail system in accordance with embodiments of the present invention.

Referring now to FIG. 4, a simplified flow chart of a method of authenticating a user for recalling voicemails from a remote voicemail system in accordance with embodiments of the present invention is indicated by the general reference character 400. The flow can begin (402) and a call can be made to a remote voicemail system (404). Next, the caller can select a "recall message" option (406) on the remote voicemail system.

Then, the caller can enter the voicemail message recipient's mailbox number (408). Next, in order to authenticate this caller on this remote voicemail system, speaker verification can be used to compare the voice signature of the caller to the voice signature of the messages in the recipient's mailbox (410). Speaker verification and/or identification can use a combination of text-dependent and text-independent techniques. For example, the system can generate random words and then prompt the user to repeat those words. Such random words for use in identifying the caller may be non-English or even gibberish, but this approach can provide a benefit in that the caller does not have to remember exact words from his voicemail message. Another benefit of this approach is improved security because it is almost impossible to fake using recorded and/or TTS-based techniques.

If there are no matching messages (412), the flow can complete (416). However, if there are any matching messages (412) for an authenticated user, that caller can be presented with the option of deleting the desired message (414) and the flow can complete (416). In this fashion, a caller can access a remote voicemail system, obtain authentication by that system using a TUI and the caller's spoken voice, and then recall a voicemail message from a recipient's mailbox.

In one embodiment, the system can prevent the caller from deleting or recalling a voicemail message that has already been heard by the recipient. In yet another embodiment, the system can notify the caller as to the success of the voicemail message recall request. In still another embodiment, the recipient can disallow recalling of any voicemail message that contains certain predetermined key words. Applications for such key word specific features can include increased security applications.

Typically, user and/or caller can gain privileges in a particular voicemail system by having a system administrator add their name to a list of authorized users. In accordance with embodiments of the present invention, a voicemail system can be provided whereby a caller can gain limited privileges (e.g., to delete or recall his own voicemail messages) as a result of leaving a voicemail message on the voicemail system. Thus, one aspect of embodiments includes a self-configuring authentication mechanism for the caller. Further, in accordance with embodiments, as a caller or user leaves a voicemail message in a target mailbox, the voicemail system can extract a voice signature of the user and store it as an accompanying data to the voicemail message.

Although speaker identification/verification is primarily described, it will be understood that other types of authentication and/or verification may be appreciated by persons skilled in the art. For example, any type of authentication suitable for use in voicemail systems can be accommodated in accordance with embodiments. Further, other telephony user interfaces or other access devices (e.g., hardware phones or "soft" phones) can be employed in accordance with embodiments. For example, other variations of access devices and/or interfaces, such as wireless devices, cellular phones, time-division multiplexing (TDM) phones, and/or voice over internet protocol (VoIP) phones, can be utilized in accordance with embodiments.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Further, distributed, or networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for recalling a voicemail message from a target mailbox having an owner, the method comprising:
   receiving the voicemail message from a user who has called the owner and have left the voicemail message in the target mailbox that was intended for the owner;
   generating a voice signature of the user by processing the voicemail message left by the user who has called the owner, the voice signature representing unique voice characteristics of the user;
   storing the voice signature with the voicemail message in the target mailbox;
   allowing a caller to access the voicemail system using a device, wherein the owner of the target mailbox is a member of the voicemail system and the caller is a non-member of the voicemail system;
   authenticating the caller using speaker verification by comparing a voice signature of the caller to the voice signature of the user stored in the target mailbox, wherein the speaker verification comprises prompting the caller to repeat a plurality of words that are selected from (i) words extracted from the voicemail message with the voice signature of the user being masked; and (ii) random words not from the voicemail message, and wherein the plurality of words are played to the caller using text-to-speech synthesis;
   receiving a selection of the authenticated caller to delete the voicemail message, wherein the voicemail message is found in the target mailbox based on input from the caller that identifies (i) at least one word in the voicemail message; and (ii) a range of dates or times of when the voicemail message was left in the target mailbox; and
   deleting the voicemail message from the target mailbox in response to the authenticated caller selection.

2. The method of claim 1, further comprising the caller gaining a privilege on the voicemail system to delete the voicemail message from the target mailbox only when a result of the comparing includes the caller being authenticated as the user.

3. The method of claim 1, further comprising searching through a plurality of voice signatures in the target mailbox.

4. The method of claim 1, wherein the receiving the selection comprises using a telephony user interface (TUI) to convey an intention by the caller to recall the voicemail message.

5. The method of claim 4, wherein the indicating receiving the selection occurs before the authenticating of the caller by using the speaker verification that comprises challenging the caller to repeat the plurality of words.

6. The method of claim 1, further comprising informing the owner of the target mailbox that the caller has recalled the voicemail message.

7. The method of claim 1, further comprising maintaining a log of all recalled messages.

8. The method of claim 1, wherein the plurality of words are provided to the caller for the speaker verification by using text-to-speech (TTS) to mask the voice signature of the user.

9. The method of claim 1, whereto the voice signature of the user is masked for security of the user in case the caller is different than the user.

10. The method of claim 1, further comprising using a frequency signature of the caller to check for unheard voicemail messages in the target mailbox.

11. A voicemail system, comprising:
a target mailbox having an owner, wherein the target mailbox contains a voicemail message left by a user who has called the owner and have left the voicemail message in the target mailbox that was intended for the owner, and wherein the target mailbox is configured to store a voice signature of the user with the voicemail message, wherein the voice signature is generated by processing the voicemail message left by the user who has called the owner, the voice signature representing unique voice characteristics of the user;
a telephony user interface (TUI) configured to use speaker verification to authenticate a caller via a device, wherein the caller is a non-member of the voicemail system, and wherein the speaker verification comprises comparing a voice signature of the caller to the voice signature of the user, and wherein the speaker verification comprises challenging the caller to repeat a plurality of words that are selected from (i) words extracted from the voicemail message with the voice signature of the user being masked; and (ii) random words not from the voicemail message, and wherein the plurality of words are played to the caller using text-to-speech synthesis; and
a recall message option configured to support deletion of the voicemail message from the target mailbox in response to the caller being authenticated as the user and the caller selecting an option to delete the voicemail message, wherein the voicemail message is found in the target mailbox based on input from the caller that identifies (i) at least one word in the voicemail message; and (ii) a range of dates or times of when the voicemail message was left in the target mailbox.

12. The voicemail system of claim 11, wherein the caller gains a privilege for deleting the voicemail message from the target mailbox only when the caller is authenticated.

13. The voicemail system of claim 11, wherein the TUI is configured to support results of a search through a plurality of voicemail messages in the target mailbox.

14. The voicemail system of claim 11, wherein the target mailbox is configured to inform the owner that the caller has recalled the voicemail message.

15. The voicemail system of claim 11, further comprising logic configured to maintain a log of all recalled messages.

16. The voicemail system of claim 11, wherein the plurality of words are provided to the caller for the speaker verification by using text-to-speech (TTS) to mask the voice signature of the user.

17. The voicemail system of claim 11, wherein the voice signature of the user is masked for security of the user in case the caller is different than the user.

18. A telephony user interface (TUI) configured to support interaction with a voicemail system via a device, the TUI comprising:
a speaker verification interface configured to authenticate a caller using the device, wherein the caller is a non-member of the voicemail system, wherein the speaker verification interface is used to compare a voice signature of the caller to a voice signature of a user stored in a target mailbox, the user having left a voicemail message in the target mailbox that was intended for the owner, the voice signature being generated by processing the voicemail message left by the user who has called the owner, the voice signature representing unique voice characteristics of the user, and wherein the caller authentication comprises prompting the caller to repeat a plurality of words that are selected from (i) words extracted from the voicemail message with the voice signature of the user being masked; and (ii) random words not from the voicemail message, and wherein the plurality of words are played to the caller using text-to-speech synthesis; and
a recall message interface configured to delete, for the authenticated caller, the voicemail message from the target mailbox in response to a selection by the authenticated caller, wherein an owner of the target mailbox is a member of the voicemail system, and wherein the voicemail message is found in the target mailbox based on input from the caller that identifies (i) at least one word in the voicemail message; and (ii) a range of dates or times of when the voicemail message was left in the target mailbox.

19. The TUI of claim 18, further configured to support results of a search through a plurality of voice signatures in the target mailbox, wherein each of the plurality of voice signatures corresponds to one or more voicemail messages.

20. The TUI of claim 18, further configured to provide a log of all recalled messages.

21. The TUI of claim 18, wherein the plurality of words extracted from the voicemail message in the target mailbox are provided to the caller for the speaker verification by using text-to-speech (TTS) to mask the voice signature of the user.

22. The TUI of claim 18, wherein the voice signature of the user is masked for security of the user when the user is different than the caller.

23. An apparatus for recalling a voicemail message from a target mailbox, the apparatus comprising:
one or more processors; and
logic encoded in one or more tangible media for execution by the one or more processors, and when executed operable to:
receive the voicemail message from a user who has called the owner and have left the voicemail message in the target mailbox that was intended for the owner;
generate a voice signature of the user by processing the voicemail message left by the user who has called the owner, the voice signature representing unique voice characteristics of the user;
store the voice signature with the voicemail message in the target mailbox;
allow access to a voicemail system by a caller using a device, wherein the owner of the target mailbox is a member of the voicemail system and the caller is a non-member of the voicemail system;
authenticate the caller using speaker verification by comparing a voice signature of the caller to the voice signature of the user stored in the target mailbox, wherein the speaker verification comprises prompting the caller to repeat a plurality of words that are selected from (i) words extracted from the voicemail message with the voice signature of the user being masked; and (ii) random words not from the voicemail message, and wherein the plurality of words are played to the caller using text-to-speech synthesis;

receive a selection of the authenticated caller to delete the voicemail message, wherein the voicemail message is found in the target mailbox based on input from the caller that identifies (i) at least one word in the voicemail message; and (ii) a range of dates or times of when the voicemail message was left in the target mailbox; and delete the voicemail message from the target mailbox in response to the authenticated caller selection.

\* \* \* \* \*

UNITED STATES PATENT AND TRADEMARK OFFICE
CERTIFICATE OF CORRECTION

PATENT NO. : 8,515,027 B2  
APPLICATION NO. : 11/448277  
DATED : August 20, 2013  
INVENTOR(S) : Shaffer et al.

Page 1 of 1

It is certified that error appears in the above-identified patent and that said Letters Patent is hereby corrected as shown below:

In the Specification

In column 7, line 50, please amend as follows:
   that follow, "a", [[an]]"an", and "the" includes plural references unless Signed and Sealed this
Eighteenth Day of August, 2015

Michelle K. Lee
*Director of the United States Patent and Trademark Office*